United States Patent Office 3,262,767
Patented July 26, 1966

3,262,767
METHOD FOR PREPARING VITREOUS SILICA FIBERS
Eugene C. S. Wang, La Puente, Calif., assignor to H. I. Thompson Fiber Glass Company, Los Angeles, Calif.
No Drawing. Filed Aug. 22, 1960, Ser. No. 50,859
5 Claims. (Cl. 65—31)

This invention relates to the preparation of vitreous silica products, and more particularly to methods for providing silica fiber materials having improved and more uniform texture, breaking strength, and other physical characteristics than materials heretofore available.

It is known to provide vitreous silica products which have high silica content by the extraction of the non-siliceous oxides from a vitreous material. Such extraction may be carried out, for example, through use of a leaching agent acting upon a glass material. For most applications the vitreous silica products are preferably in the forms of small diameter fibers, ranging from submicron size to several microns and more in diameter, and have silica contents of 90% and more, on a dehydrated basis.

Vitreous silica products, such as the high silica content fibers, are widely used for a number of superior characteristics which they possess in high temperature environments. The fibers have high softening points, are extremely stable chemically, readily incorporated in finished products, and have particularly good resistance to erosion and decomposition. Structures which include such fibers may be used as exposed surfaces at temperatures up to 15,000° F. for short periods of time. Various forms are employed for these different purposes, including woven textiles, rovings, yarn, cordage, batts, and bulk fibers. In these different forms, the fibers may be used as reinforcements in laminated or other solid bodies which are exposed to extremely high temperature gases. They may also be employed in insulating blankets and for thermocouple insulation, filtration elements, and a wide variety of other purposes.

In leaching vitreous materials to remove the nonsiliceous oxides, it is often difficult to obtain desired and consistent physical characteristics. A great many factors are involved in the leaching process, which is affected by, among other things, the nature and concentration of the leaching agent, the nature of the material initially employed, and the duration and temperature level of the leaching. Variations in these and other factors often result in differences in the final product, and these differences may severely affect the quality of the product in one or more respect. In a general way, the differences in quality may be visualized in terms of breaking strength, and in terms of texture, or the drapability and "hand" of the fibers. A textile material having a uniformly soft texture, as opposed to a partially brittle texture, is superior for a number of reasons. The softer material has a greater resistance to abrasion, and thus may be handled more vigorously and more rapidly. Such materials may be creased, for example, without losing strength, whereas brittle materials may diminish markedly in strength following creasing. Higher breaking strengths are also desirable for virtually every practical use of the fibers. The silica fibers are necessarily weaker than the original glass fibers subsequent to extraction of the nonsiliceous oxides, and it is usually desirable to keep this reduction in strength to the lowest possible level.

It is also of primary importance that the product obtained be uniform, and that the results of a process be consistent. In large scale production of high silica textiles, for example, the textile materials may be handled in rolls which must be substantially the same in texture and strength throughout.

It is therefore an object of the present invention to provide a method of processing vitreous products to provide high silica content materials of uniformly soft texture and high breaking strength.

It is another object of the present invention to provide improved methods for leaching glass fibers to provide vitreous fibers of high silica content having improved physical characteristics, and greater consistency of quality in manufacturing.

In accordance with the present invention, vitreous silica fibers of improved physical characteristics are provided by employing minute silica particles in a manner which permits the fibers to move without restraint when shrunk. In a specific example of a process in accordance with the invention, glass fiber textile material is leached by immersion in a bath of hydrochloric acid to extract nonsiliceous oxides. The bath is maintained at an elevated temperature which is, however, less than the boiling temperature of the acid. Minute particles of silica, in the size range from submicron diameters to 50 microns in diameter, are dispersed throughout the leaching agent in a concentration ranging from the order of 0.001% upward. After extraction of the nonsiliceous oxides to a desired degree, the textile is removed from the leaching agent, washed and fired. It is found that the finished product has improved drapability, breaking strength, resistance to abrasion and creasing and less brittleness than products heretofore available.

The glass products which may be employed in practicing methods in accordance with the presence invention will usually be in the form of glass fibers. As is described in Patent No. 2,491,761, to Parker et al., they are preferably the high alumina, high lime glasses, because these lend themselves particularly well to the production of high silicas content fibers through extraction by leaching. As discussed in the above identified patent, however, other glasses may be employed if appropriate adjustments are made in the leaching process. The initial fibers range in size from the order of a micron or less in diameter to approximately 0.001 inch in diameter. The fibers may be provided in bulk form, in batts, or as cordage, yarn or other forms of drawn fibers.

In order to provide a specific example, the discussion will center about drawn fibers woven into textile material, although the methods of the invention pertain to other fibers and products as well.

High vitreous silica content textiles have particularly widespread uses for thermal and electrical insulation, for ablation characteristics, for hot gas and molten metal filtration, and for other applications. At the same time, however, textiles present particularly severe problems during leaching processes. It is usually required that the materials have high and uniform strength, freedom from brittleness, resistance to abrasion, and handling properties. The hand and feel and other characteristics peculiar to textiles bear significantly on the manner in which high silica textiles may subsequently be impregnated with a resin coating and otherwise processed. Therefore, the benefits in superior properties and uniformity which are derived by practicing the present invention with textile materials illustrates the application of the invention in the most critical and at the same time most useful context. The same benefits will be understood to be derived, to a greater or lesser extent, with respect to the other types of materials.

The acids which are employed for the extraction of nonsiliceous oxides from the intial glass product may consist of any active acid, either organic or inorganic, which will react with the glass forming oxides other than SiO$_2$. Thus, HCl, H$_2$SO$_4$, HNO$_3$, acetic and chloroactic acids, among others, may be employed. It is preferred, in the present example, to use HCl, inasmuch as the resulting chloride salts formed from the high lime glasses are soluble in the acid. While the acid may vary widely in strength from .1 N to 5 N or more, it is preferred to employ as strong as acid as is convenient, without the acid being so viscous as to limit fluid passage into and out of the fibers of the glass. As an example, 14% HCl may be employed, and in order to increase the activity of the acid it may be maintained at a temperature in excess of 100° F., but below the boiling point. Thus, the acid is preferably maintained, for purposes of the present example, in the range from 140° to 200° F.

The time of leaching is dependent upon a great many factors, including the ratio of initial glass to acid, the silica content of the glass, the nature of the glass, the concentration of the acid and the temperature of the acid. Leaching times of from 1 to 40 hours may be employed, depending on the thickness of the woven fabric, the temperature and concentration of the acid, the ratio of glass to acid, the rate at which the acid moves through, and other factors. During the leaching, the textiles may be turned periodically, as every hour, so as to drain off the acid from the fibers and to insure a fresh change of acid at the fiber surfaces and a continued high rate of extraction.

An important step in accordance with the present invention consists in the use of minute silica particles to modify the physical disposition of the indivdual fibers. In one specfic example, the silica particles may be in a dispersion throughout the leaching agent. While a number of different forms may be employed, as described in more detail below, it is preferred to employ a colloidal suspension of silica. A particularly suitable form of colloidal suspension consists, in undiluted form of 30% hydrated SiO$_2$. The particle size is of the order of one micron in diameter, although the particles will vary from submicron size to many microns in diameter. The concentration which is employed is approximately .01% SiO$_2$ by weight, for this example.

To insure a dispersion of the silica particle agent in the leaching solution, the colloidal suspension is distributed throughout the acid comprising the leaching bath, and the bath is agitated so as to further insure uniformity. The uniform dispersion is obtained prior to the immersion of glass in the leaching agent.

Subsequent to the completion of the leaching to a desired silica content, the textile is removed from the leaching agent and washed. Usually, the silica content desired will be in excess of 99% SiO$_2$ on a dehydrated basis. The washing is carried out with successive changes of wash water until completely free of acid and salts. The wash water may be slightly acidified, with a pH content of 3 to 5. Following the washing, the bulk of the excess water may be removed, and the leached textile may be dried at 200° F. until the remaining excess moisture is removed.

It is usually desired to substantially dehydrate the fibers and to heat shrink the fibers by firing the textiles at temperatures in the region of 1800° F. The firing temperature may be maintained for several minutes to approximately one hour, and the water of hydration and absorbed water substantially driven off. Subsequent to the removal of this water, some water is reabsorbed, without affecting the nature of the materials. The shrinkage is an irreversible process, and usually results in reduction in area in excess of 15%, typically 25%. Both prior to and after the heat shrinkage, a significant improvement may be noted in the condition of the fibers. The textile appears to be fluffy, with the individual fibers separated and relatively freer from restraint.

High vitreous silica content products provided in accordance with the above steps exhibit markedly improved properties, when comparisons are taken between sufficiently large numbers of samples. In addition to fluffiness, drapability and an improved hand, the textiles have little brittleness. In physical characteristics, significant gains are effected in breaking strength, crease resistance and abrasion resistance. The breaking strength increase in pounds per square inch is approximately 20%, at a minimum. Further, no decrease in breaking strength is noted subsequent to applying a deliberate crease to the material, whereas high vitreous silica content textile fabrics heretofore available have lost in excess of 50% of their breaking strength subsequent to creasing. Similarly, a brittle fabric when rubbed together will immediately begin to abrade and fray, whereas textiles provided in accordance with this invention have marked superiority in this respect as well.

While the mechanism by which the dispersion of silica operates is not satisfactorily understood, there are indications that the particles may maintain a physical separation between the fibers through an electrostatic action. It appears that the particles accumulate like electrical charges. Therefore, when the particles are interspersed between and affixed to adjacent fibers, sufficient forces of repulsion may be present, because of the mutual repulsion of like charges, for the fibers to be kept separated. The particles appear to be retained throughout the fibers during leaching, subsequent washing and finally during firing. The tendency of the fibers to cling together is therefore minimized, and the restraining forces acting upon the individual fibers are also minimized. Following the shrinkage from the firing, the fibers are still free from restraint and the fluffiness and soft hand of the textile is preserved, so that the textile fabric has superior drapability.

The results which are thus achieved are completely unexpected, because colloidal silica is known to have slip resistant properties when used as a coating or size material. Here, the freedom of movement of adjacent fibers relative to each other is actually increased. A further unexpected element is derived from the extremely small concentrations which may be used with good effect. In some instances, colloidal silica has been employed in a concentration so low that the ratio of silica to leaching agent was one part in 160,000 by weight.

Other explanations for the action of the minute silica particles may also be propounded. The silica particles may provide a separation of the individual fibers through a physical action, either through formation of a film of the fibers or because of the presence of the individual particles themselves. The extremely low concentrations which are used militate somewhat against this explanation. It may also be that the presence of the silica particles has an effect of a chemical nature on the leach. It may be that a monomolecular surface layer of the silica in the fibers dissolves through the action of the leaching agent. The presence of dispersed silica particles in the acid may act to limit this dissolving action by causing a high percentage of dissolved silica to be present in the acid.

A number of considerations should be observed in processes in accordance with the present invention. An excess of added material may cause the leaching agent to form a gel, limiting the effectiveness of the leaching action. Too much silica causes the product to become powdery, whereas the addition of too much colloidal agent apparently results in a film of the colloid on the product, thus giving the product the appearance of the colloidal agent. It is preferred to employ colloidal silica which has not been repeatedly exposed to the leaching action, inasmuch as the effectiveness of the silica has been found to decrease after one hundred hours.

These silica particles need not be added in colloidal form, although this is preferred, nor is the practice of the invention limited to the particle sizes indicated above. It has been found that particles sufficiently small to pass a 325 mesh (using the standard Tyler screen as a basis)

will have beneficial effects. In terms of size, particles sufficiently small to pass the 325 mesh will be of 44 microns or less in diameter. It is further found that with these larger sized particles concentrations of SiO$_2$ of approximately .06% should be employed for the conditions above given. The dispersed particles should be of a composition which withstands the leaching, and additionally withstands the firing subsequent to the leaching without discoloring or otherwise affecting the product. Silica and silica compounds have particular potentiality in these respects, and are preferred.

While the method of the invention has been discussed with respect to the addition of silica to the leaching agent, drapability, tensile strength and hand may also be improved over prior art methods by the addition of silica at other times and in other manners prior to firing. The dispersion of particles, in the sense of a spatial distribution of the particles, throughout the leach, may also be obtained by affixing the particles to the fibers themselves. The fabric itself may be dipped in a colloidal silica prior to leaching, so that the colloid clinging to the fabric is used as the means of dispersion. It has also been found that beneficial results are obtained if the colloidal silica is permitted to dry on the fibers. A corollary of this fact is that, where more convenient, the colloidal silica may be applied as a sizing to the fibers themselves during drawing or prior to weaving.

A fluffy product, in which individual fibers do not cling to cause brittleness, may also be obtained if firing is preceded by the addition of colloidal silica to the wash. The presence of the particles during heat shrinking, when added by means of a liquid solution in this manner, permits attainment of an ultimate product of improved texture and breaking strength. The liquid solution may also consist of a dispersion of silica into which the fabric is immersed subsequent to washing and drying but prior to firing.

It will also be recognized by those skilled in the art that dispersed silica particles may also be obtained in the leaching agent in a number of other ways. If relatively high concentrations of soluble silica are present in the leaching agent, the addition of salts may cause the soluble silica to precipitate out, thus providing the desired particles in solution. The particles might also be provided by beginning the leaching with soluble silica present at or near the level of saturation. During the leaching, as soluble silica dissolves, therefore, the silica particles would again precipitate out, providing the desired dispersion of particles.

A good measure of the improved texture and physical characteristics of these products is provided by the drapability or stiffness of the material. Accordingly, results are provided below of measurements made of samples treated under different conditions and evaluated by standard tests. In accordance with these tests, 1" x 6" samples of the leached fired textile were placed on a measuring block which included a flat upper surface and an additional obliquely disposed reference surface which angled downwardly from the flat surface at an angle of 41°. The sample was placed along the flat surface with its axis of elongation extending normal to the line at which the surface angled downwardly. The sample was the uniformly restrained from the top by a planar member holding the sample against the flat surface, as the sample was moved toward the angled portion. Under these conditions, as a sample moves across the line marking the beginning of the downwardly angled portion, the free end of the sample begins to bend downward toward the angled portion. An extremely stiff sample, of course, may thus be moved along virtually its entire length without bending down sufficiently to touch the angled reference surface. A very limp sample will, on the other hand, bend in a very short length to touch the angled reference surface. The amount of material remaining on the flat surface when the top of the sample touched the angled surface was measured, to provide an indication of the drapability of the sample. For each sample, an average was derived from the four readings taken from the two sides of each end.

The leaching was controlled as follows for the samples:

Acid/glass ratio _____ 12/1.
Percent HCl _____ 14% by weight.
Time of leach _____ 2½ hours.
Temperature of leach _____ 180° to 200° F.
Agitation _____ Intermittent With the above, colloidal hydrated silica particles in a concentration of .01% SiO$_2$ by weight were added to one of two leaching acids, while no particles were added to the other, or control sample. The drapability of the product provided by the steps in accordance with the present invention averaged 4.50 compared to an average of 3.50 for the control sample. In addition, the control sample was materially stiffer in texture and somewhat more irregular in appearance.

The tensile strengths of fibers prepared by processes in accordance with the present invention are materially improved over fibers as previously prepared. Increases in tensile strengths of up to 50% have been noted, with greatest increases tending to occur with fabrics of the largest thickness. The improvement in tensile strength is of course of great importance, because of the betterment in physical properties and potentially for weight reduction of structures in which the fibers are used.

The consistency of the product derived by using the method of the invention is also significant. By eliminating partial and intermittent brittleness the ultimate product has a minimum of waste, and can be fabricated more readily to precise specifications. In addition, handling is considerably simplified because of the uniformity. Where bagginess might tend to appear improved texture permits the material readily to be straightened out.

Methods in accordance with the present invention have been described which are principally concerned with the product of textiles containing fibers of high silica content. The advantages of the invention may also be derived, however, with other types of vitreous silica materials. Silica flakes, for example, are at times subject to forming into lumpy masses which make the use of the flakes as insulating material very difficult. Similarly, fibers in bulk and batt form may tend to form into bundles. When glass flakes or unwoven fibers are leached to provide silica flakes or fibers by methods in accordance with this invention, however, the product thus provided is uniform, fluffy in handling, and free from lumpy masses.

While there have been described above various steps for providing high silica content products in accordance with the present invention, it will be appreciated that various other alternatives and modifications are possible. Accordingly, the present invention should be taken to include all variations and alternative steps falling within the scope of the appended claims.

What is claimed is:

1. A method of preparing improved vitreous silica fibers having increased breaking strength, drapability, hand and resistance to abrasion and decreased brittleness, which method comprises uniformly dispersing silica particles having a particle size of up to 44 microns on fibers during conversion of said fibers from glass fibers to vitreous silica fibers, and thereafter firing said fibers to shrink the same.

2. The method in accordance with claim 1 wherein said conversion comprises leaching glass fibers having an average diameter of up to about 0.001 inch in an acidic leaching agent which extracts non-siliceous oxides from said fibers but which is essentially non-reactive with silica, washing the leached fibers free of the leaching agent, drying the washed fibers and firing the fibers to shrink the same.

3. The method in accordance with claim 2 wherein said dispersing is effected during said leaching, said silica particles being in colloidal form in said leaching agent.

4. The method in accordance with claim 2 wherein said dispersing is effected before said leaching, said silica particles being in colloidal form.

5. The method in accordance with claim 2 wherein said dispersing is effected after said leaching, said silica particles being in colloidal form.

References Cited by the Examiner

UNITED STATES PATENTS

| 2,118,386 | 5/1938 | Swinehart | 156—24 X |
| 2,493,984 | 1/1950 | McKay | 156—24 X |
| 2,494,259 | 1/1950 | Nordberg. | |
| 2,526,870 | 10/1950 | Jelinek et al. | |
| 2,635,390 | 4/1953 | Parker. | |
| 2,843,461 | 7/1958 | Labino. | |

FOREIGN PATENTS

| 312,054 | 7/1930 | Great Britain. |
| 637,401 | 5/1950 | Great Britain. |

DONALL H. SYLVESTER, *Primary Examiner.*

ARTHUR P. KENT, P. ISAKOV, F. W. MIGA,
*Examiners.*